N. C. NELSON.
BEAN VINE GATHERING APPARATUS.
APPLICATION FILED JAN. 8, 1916.

1,226,573.

Patented May 15, 1917.
3 SHEETS—SHEET 1.

WITNESSES:

INVENTOR.
Noah C. Nelson.
BY
C. J. Williams,
ATTORNEY.

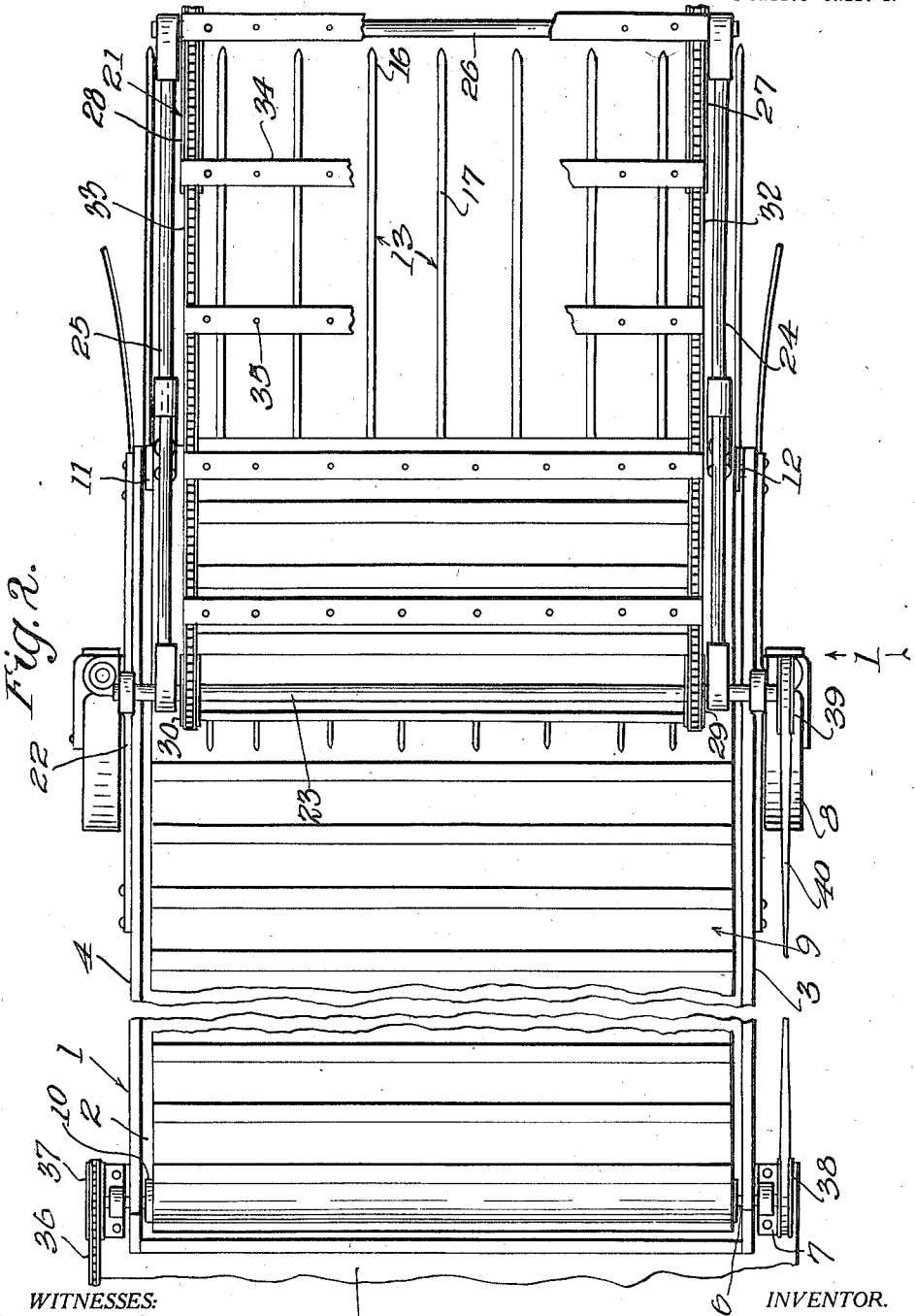

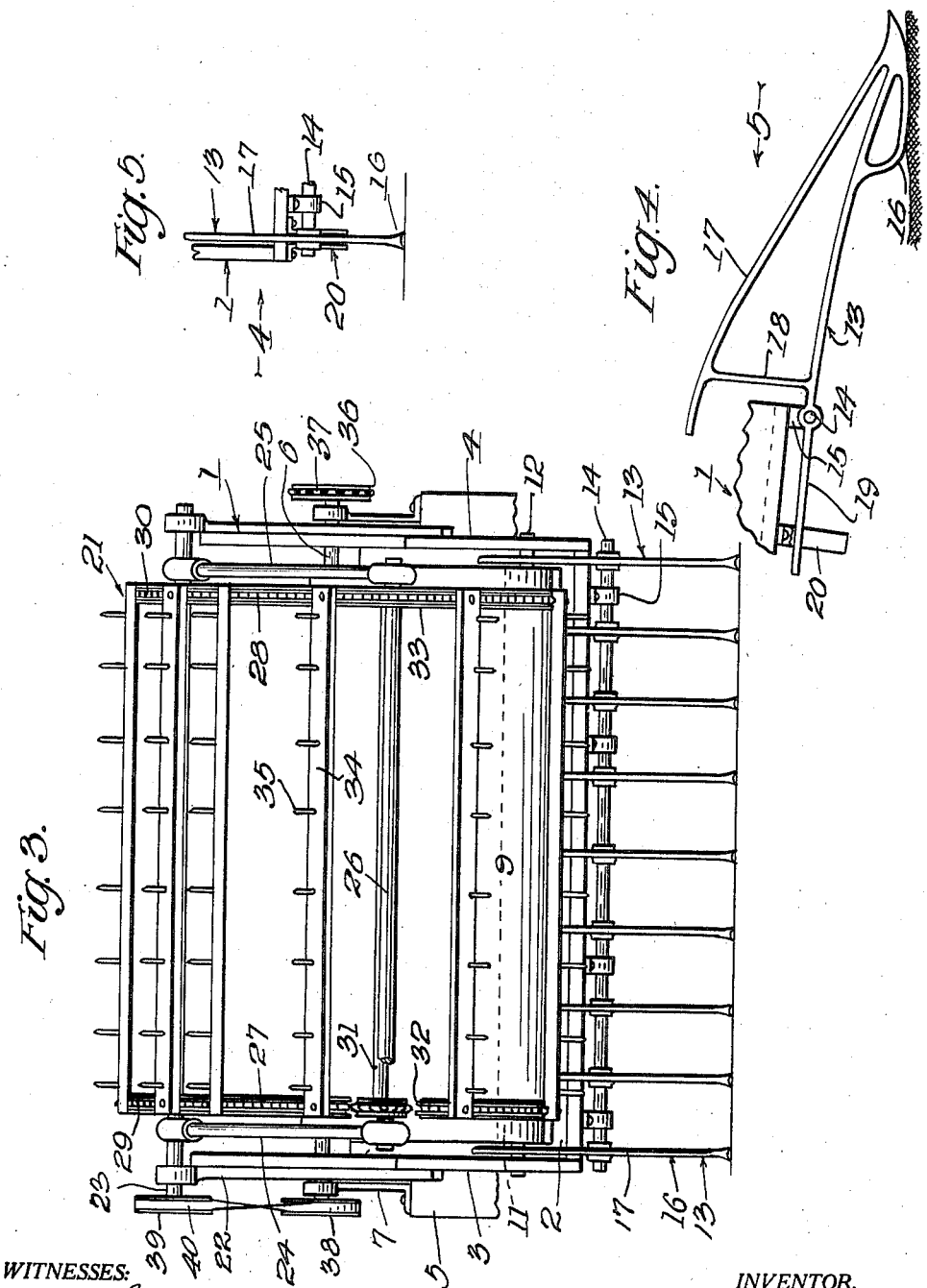

UNITED STATES PATENT OFFICE.

NOAH C. NELSON, OF IMPERIAL, CALIFORNIA.

BEAN-VINE-GATHERING APPARATUS.

1,226,573. Specification of Letters Patent. Patented May 15, 1917.

Application filed January 8, 1916. Serial No. 70,996.

*To all whom it may concern:*

Be it known that I, NOAH C. NELSON, a citizen of the United States, residing at Imperial, in the county of Imperial and State of California, have invented new and useful Improvements in Bean-Vine-Gathering Apparatus, of which the following is a specification.

This invention relates to mechanism for gathering bean vines and the like after they have been cut and left in rows upon the ground, and consists of a device to be attached to the forward end of a combined harvester, so that when the harvester is in operation the device travels along on the ground and gathers the bean vines and delivers them to the threshing mechanism of said harvester.

At the present time the common practice of gathering the bean vines consists of first cutting them in the field, gathering them in piles or stacks, and then hauling them some distance to a stationary threshing apparatus, and it is the prime object of this invention to provide a device which will eliminate the several unnecessary handlings of the bean vines. The device is simple in construction and may be successfully handled by three or four men whereas the present operation generally requires forty or fifty men.

Referring to the drawings:

Fig. 2 is a top plan view of Figs. 1 and 3.

Fig. 3 is a front elevation of Figs. 1 and 2, as seen looking toward the forward end of the machine.

Fig. 4 is a detail of one of the pivotal lifters, a series of which are mounted on the front end of the apparatus.

Fig. 5 is a fragmentary front elevation of Fig. 4, as indicated by arrow 5 in Fig. 4.

Figure 1:
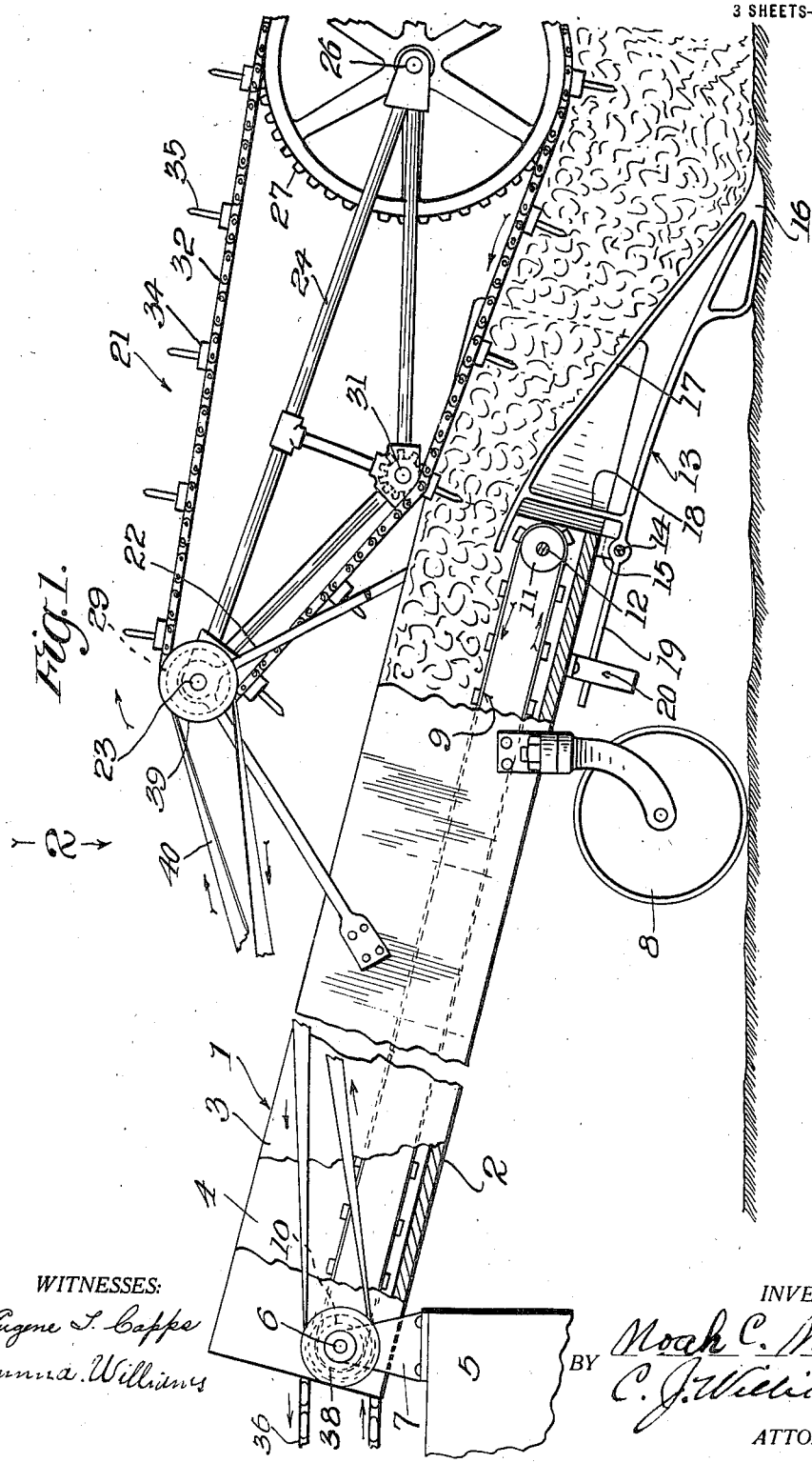
Figure 1 is a fragmentary side elevation of my bean gathering apparatus as seen looking in the direction of arrow 1 in Fig. 2.

Referring to the drawings in detail, the bean gathering apparatus embodying the principles of my invention consists of a suitable frame work which may be constructed of boards in the form of a trough-shaped chute 1, having a bottom 2, and side boards 3 and 4. Said chute 1 may be of considerable length and pivotally mounted at one end to the forward end of the harvester 5, by the shaft 6 mounted in suitable bearings 7, a fragment of said harvester 5 being shown in the drawings. The chute 1 extends forwardly and downwardly at an angle, the forward end thereof being supported a short distance above the ground level by a pair of casters 8. As the apparatus is moved forward the casters 8 follow the surface of the ground and the pivotal mounting of the chute upon shaft 6 allows said chute to move up or down to take up for any variations in the surface of the ground.

A belt conveyer 9 is mounted near the bottom 2 of the chute 1 and extends from one end of said chute to the other, the conveyer 9 being mounted upon rolls 10 and 11 which in turn are mounted upon the transverse shafts 6 and 12, said shaft 12 being journaled in the side pieces 3 and 4.

A series of pivotally mounted lifter arms 13 are mounted upon the shaft 14, said shaft being mounted in bearings 15 attached to the forward end of the bottom 2. The lifter arms 13 extend forwardly and downwardly and are provided with runners 16 which permit the forward ends thereof to enter the ground slightly but not enough to impede the forward movement of the lifter arms. Arms 17 extend upwardly and backwardly from the runners 16 and extend over the roll 11 and are braced in position by braces 18. Portions 19 extend backwardly from shaft 14 and are held between the guideways 20, so that the lifter arms may oscillate in a vertical plane upon shaft 14 independently of each other.

A movable raking mechanism 21 is mounted upon the supporting brackets 22 over the conveyer 9 and lifter arms 13, said raking mechanism comprising the shaft 23 upon which the side frames 24 and 25 are journaled, said frames extending forwardly and having a second shaft 26 journaled therein. A pair of comparatively large gears 27 and 28 are mounted upon this shaft and a pair of much smaller gears 29 and 30 are mounted upon shaft 23, said smaller gears being mounted in line with the large gears. A third shaft 31 is mounted in the side frames 24 and 25 below the shafts 23 and 26, and a pair of small sprocket wheels are mounted upon this shaft.

A pair of endless sprocket chains 32 and 33 are led over the several gears and sprockets 27, 28, 29 and 30 and the sprockets on the shaft 31. Cross bars 34 are attached to said chains at intervals, and a series of teeth or fingers 35 are attached to the several cross bars and extend outwardly therefrom.

The mechanism 21 swings upon the shaft 23 and the weight of the forward end carrying shaft 26 rests upon the bean vines as they are moved backwardly upon the lifter arms 13, the tendency being to carry said vines to the conveyer 9 upon which they are carried to the threshing mechanism.

The bean vines are cut and left in rows and the chute 1 is moved forwardly as hereinbefore explained to take up a row at a time.

A driving chain 36 is run forward from the threshing mechanism to a sprocket 37 mounted upon one end of shaft 6, which operates the conveyer 9.

A pulley 38 is mounted upon the opposite end of shaft 6 and a pulley 39 is mounted upon shaft 23, said pulleys being connected by a reversed belt 40, so that the raking mechanism 21 is operated in the proper direction in relation to the conveyer 9. The raking mechanism travels at approximately the same speed as the conveyer and both travel at about the same speed as the machine moves forward over the ground.

As the bean vines are drawn toward the conveyer by the raking mechanism any dirt or other foreign substance will be sifted out when the vines pass up over the lifter arms on account of the spaces between said lifter arms, as shown in Fig. 3.

It will be seen that as the chains pass from the sprockets on shaft 31 they travel upwardly at an angle to the sprockets 29 and 30, the object being to loosen the vines from the teeth 35 as they are placed upon the conveyer 9.

What I claim and desire to secure by Letters Patent of the United States, is:

1. A bean gathering apparatus comprising a chute pivotally supported to the frame of a harvester, said chute extending downwardly and forwardly, a pair of casters mounted intermediate the ends of said chute for supporting the same above the ground, a conveyer mounted in said chute, a plurality of independently movable lifter arms pivoted to the forward end of said chute, the forward ends of said arms being otherwise unsupported and running upon the ground, a raking mechanism pivotally mounted to the rear and above said lifting arms, the weight of the free end of said raking mechanism resting upon the bean vines as they are drawn upon the lifting arms, said raking mechanism including an endless carrier having bean engaging fingers mounted thereon, said endless carrier moving during a portion of its travel substantially parallel to said conveyer and in advance thereof, thence at an abrupt angle upwardly and over the pivoted support of said carrier, and means for operating said conveyer and said raking mechanism.

2. A bean gathering apparatus comprising a chute pivotally supported to the frame of the harvester, said chute extending downwardly and forwardly, a conveyer mounted in said chute, a plurality of independently movable lifter arms pivoted to the forward end of said chute, the forward ends of said arms being otherwise unsupported and running upon the ground, a raking mechanism pivotally mounted to the rear and above said lifting arms, the weight of the free end of said raking mechanism resting upon the bean vines as they are drawn upon the lifting arms, said raking mechanism including an endless carrier having bean vine engaging means mounted thereon, and moving during a portion of its travel substantially parallel to said conveyer and in advance thereof, thence at an abrupt angle upwardly and over the pivoted support of said carrier, and means for operating said conveyer and said raking mechanism.

3. A bean gathering apparatus comprising a chute pivotally supported to the frame of the harvester, said chute extending downwardly and forwardly, a plurality of lifter arms pivoted to the forward end of said chute and running upon the ground, a raking mechanism pivotally mounted to the rear and above said lifting arms, the weight of the free end of said raking mechanism resting upon the bean vines as they are drawn upon the lifting arms, and means for operating said conveyer and said raking mechanism.

NOAH C. NELSON.

Witnesses:
A. J. WILLIAMS,
JUSTINE OTTOFY.